(No Model.) 5 Sheets—Sheet 1.
C. H. DOOLEY.
COMBINED CHECK ROW AND DRILL CORN PLANTER.
No. 593,295. Patented Nov. 9, 1897.

Witnesses:
G. R. Richards.
H. M. Richards.

Inventor:
Clarence H. Dooley,
By W. B. Richards,
Atty.

(No Model.) 5 Sheets—Sheet 2.
C. H. DOOLEY.
COMBINED CHECK ROW AND DRILL CORN PLANTER.
No. 593,295. Patented Nov. 9, 1897.

Witnesses:
G. R. Richards.
H. M. Richards.

Inventor:
Clarence H. Dooley,
By W. B. Richards,
Atty.

(No Model.) 5 Sheets—Sheet 4.
C. H. DOOLEY.
COMBINED CHECK ROW AND DRILL CORN PLANTER.

No. 593,295. Patented Nov. 9, 1897.

UNITED STATES PATENT OFFICE.

CLARENCE H. DOOLEY, OF BROKAW, ILLINOIS.

COMBINED CHECK-ROW AND DRILL CORN-PLANTER.

SPECIFICATION forming part of Letters Patent No. 593,295, dated November 9, 1897.

Application filed March 16, 1897. Serial No. 627,785. (No model.)

*To all whom it may concern:*

Be it known that I, CLARENCE H. DOOLEY, a citizen of the United States, residing at Brokaw, in the county of McLean and State of Illinois, have invented certain new and useful Improvements in a Combined Check-Row and Drill Corn-Planter, of which the following is a specification.

While the main features of my invention relate to improvements which are applicable to and may be incorporated in planters of various kinds, such main features are herein mainly described and shown in the drawings as incorporated in a combined check-row and drill planter of that class in which the valve or seed-dropping mechanism in each seedbox is operated by a wheel or wheels of the planter or other traction wheel or wheels or endless belts which contact with the ground to separate from the supply of seed in the seedbox and deliver single grain or kernel charges of seed to a discharging-valve or lower valve in the seed-tube below, and in which the lower valve for check-row planting is actuated at uniform distances in the travel of the planter by contact of a forked lever on the planter with tappets on a check-row line which is stretched over the ground adjacent to the path of the planter. Combined check-row and drill planters of said class have been very salable for various causes, but mainly because they were so quickly and easily convertible from a check-row to a drill planter, and vice versa, without change of the seedbox valves or disks and because of the fact that in them the check-row line in only operating the lower valve was relieved of the greater part of the strain thereon, and hence and from the less strain thereon did not wear out so rapidly, did not produce side draft on the planter, and did not pull its anchors out of the ground, but after extensive use they are being discarded, because the number of grains of seed delivered by them to the lower valve or valves for hills or different deposits in check-row planting varied greatly and in drill-planting the seedbox valve or disk missed many deliveries of single grains, and hence deposited the grains at very irregular distances apart. These defects in planting arose from two causes. First, the wheel or wheels for actuating the seed-cup disks were liable to slip or slide for short distances when the brakes were applied to them, would not rotate uniformly on uneven soil, and would rotate at abnormal rates when in contact with clods, sods, and other obstructions and in passing over high or low places; and, second, the seed-cup disks in the seedboxes failed in uniformly separating single grains of corn from the supply in the seedbox and failed in receiving such single grains or kernels in all or nearly all of their seed-cups at each and every revolution of the series of seed-cups, and hence some of the seed-cups would pass under the cut-off and over the discharge-opening empty and fail to deliver grains to the seed-tube.

The problem of overcoming the first hereinbefore-recited defect in planters was substantially solved by the invention shown and described in Letters Patent of the United States granted to myself and Harry L. Dooley, dated November 28, 1893, No. 509,797, and reissue thereof, No. 11,504, dated July 23, 1895; and the main object of my present invention has been to solve the problem of overcoming the second hereinbefore-recited defect by providing a seed measuring and delivering mechanism in the seedbox which will, when operated as hereinafter described or otherwise, effectually separate single grains of seed from the supply in said seedbox, arrange them on edge, and deliver them edgewise to the seed-cups, which will receive them singly in substantially every one of the seed-cups of the seed measuring and delivering mechanism at each revolution of the series of seed-cups and deliver said single grains regularly, uniformly, and with nearly absolute certainty from each seed-cup of said measuring and delivering mechanism as said seed-cups pass successionally in their orbital paths over the throat of the seed-tube.

Further objects of the invention are to provide means by which the driver without moving from his seat on the planter can change the planter from a check-row to a drill-planter, and vice versa, and to provide means by which he can change it from a check-row in which the lower valve alone is operated by a check-row line to a planter in which the lower valve can be operated by the driver with his feet, while the seedbox-valves are operated by the wheel or wheels.

Other objects of the invention are to provide an improved clutch of the same class as the clutch of the patent and reissue thereof hereinbefore referred to, together with novel arrangement thereof in the check-row mechanism and novel combinations of parts by which it is operatively connected with said mechanism, and, further, to provide an improved discharging-valve at the lower end of the seed-tube.

Other objects of the invention are hereinafter described.

To the end of carrying out these different objects my invention consists in constructions, arrangements, and combinations of parts hereinafter described and made the subject-matter of the claims which form part of this specification.

In the accomyanying drawings, which show my improvements.

The reference-numerals herein used indicate, respectively, the same part in the different figures of the drawings.

The curved arrows indicate without further description the direction of movement of parts, and where single figures of the drawings are hereinafter referred to such references are only intended to point out a figure in which the parts referred to are well shown, while other figures may show the same part or parts.

My improvements may be incorporated in planters of any preferred construction.

For the purpose of illustrating the preferred construction of the parts of my improvements and the combinations thereof and their operations I have shown said improvements incorporated in a corn-planter of ordinary construction, except as hereinafter more particularly described. This ordinary planter, as shown, comprises, Fig. 1, a forward frame 1 with runners 2, seed-tubes 3, tongue 4, extending in this instance in rear of the forward frame and shown at Figs. 1, 3, and 8 as broken away, seedboxes 5, transverse frame-bars 6, and rotatable shaft 7 for operating the seed-cup disks or wheels in the seedboxes 8, and a rear frame 9 with side frame-bars 10, mounted on an axle 11 and hinged at their forward ends to the forward frame, wheels 12, mounted on the axle 11, scrapers 13 and their actuating mechanism, seat 14, foot-lever 15, pivotally connected with the axle, bent upwardly to form a locking hand-lever 16, and pivotally connected at said bend to the lower part of a sector-shaped rack-bar 17, which is connected with the rear end of the tongue by a bracket-arm 18, sprocket-wheels 19 and 20, fixed to the axle 11, sprocket-chain 21, gearing either of the wheels 19 or 20 with a sprocket-wheel 22 on the rotatable shaft 7, and an idler 23.

Figures 1, 2:
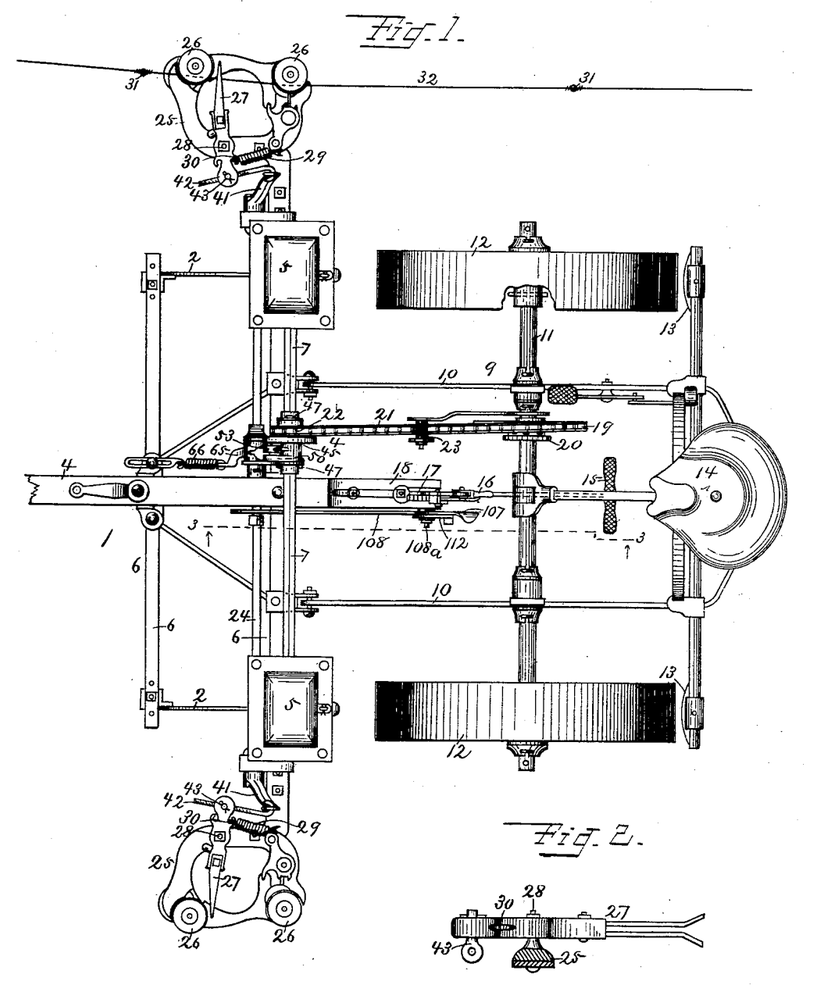
Figure 1 is a top plan of an ordinary corn-planter, partly broken away, in which my improvements are incorporated and in which top plan certain features of said improvements are shown.
Fig. 2, an enlarged front elevation of one of the forked levers and adjacent parts and sectional elevation of other adjacent parts.

One of the wheels 12 is broken away at Fig. 1 to show its hub fixed to the axle 11 for rotating it. Both wheels 12 may be fixed to the axle for the same purpose, or they may be connected therewith by any suitable clutch which will facilitate turning the planter around, backing, &c. The forward frame is also shown in Fig. 1 as provided with ordinary check-row mechanism consisting of a rock-shaft 24, check-row heads 25 with guide-pulleys 26, forked levers 27, connected each by a pivot 28 with the adjacent head, and retracting-springs 29, connected with a head 25 at one end and each connected at its other end with a hook 30 on a forked lever.

The connection of the forked levers with the ends of the rock-shaft 24, as shown, constitutes one feature of my invention and is hereinafter fully described. The forked levers 27 are actuated by contact with the tappets 31 on the check-row line 32.

The operations of the ordinary planter hereinbefore briefly described are well known and need not be further herein described.

The lower valve 33 is of curved form to fit a correspondingly-shaped projection 34 on the lower end and rear side of the seed-tube, Figs. 3, 8, 11, and 12, and is held in working relation to the seed-tube by a removable cap-plate 35 with guide-grooves 36 for said valve. The valve 33 is pivotally connected at its upper end part with a link 38, the upper end of which is adjustably connected with a link 39, which is pivotally connected with the outer end of an arm 40, which projects from the rock-shaft 24.

Each forked lever 27 is connected with a radius-arm 41, which projects from the adjacent end of the rock-shaft 24. Said connection is effected by means of a link-rod 42, with a hook on one end which engages with an eye in the outer end of the arm 41 and the body part of which is screw-threaded through an eye, Fig. 2, in the lower end of an eyebolt 43, the upper portion, Fig. 2, of which is pivotally mounted in the inner end of the forked lever. By first removing the eyebolt 43 from the forked lever it may be adjusted on the link 42 to lengthen or shorten the effective length of said link between the forked lever and the radius-arm 41, and thus provide for the forked lever making its full and limited swing when the check-row head is adjusted forward or back in the usual manner for operating the lower valve properly with slower or more rapid gaited animals.

Figure 8:
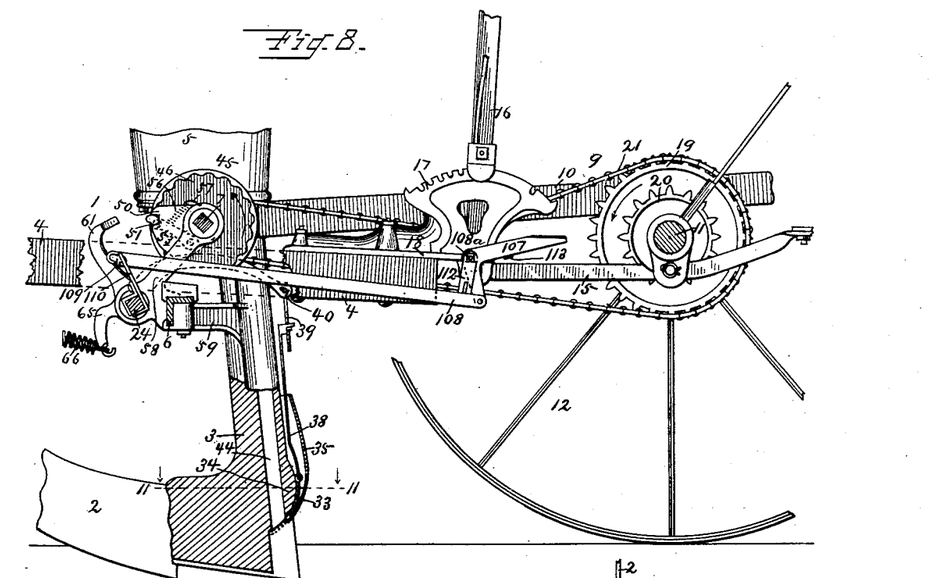
Fig. 8, same sectional elevation as Fig. 3 with parts in different relative positions from that shown at Fig. 3 and with the near side of the lower end of the seed-tube and lower valve shown as broken away.
Figures 9, 10, 11, 13, 14:
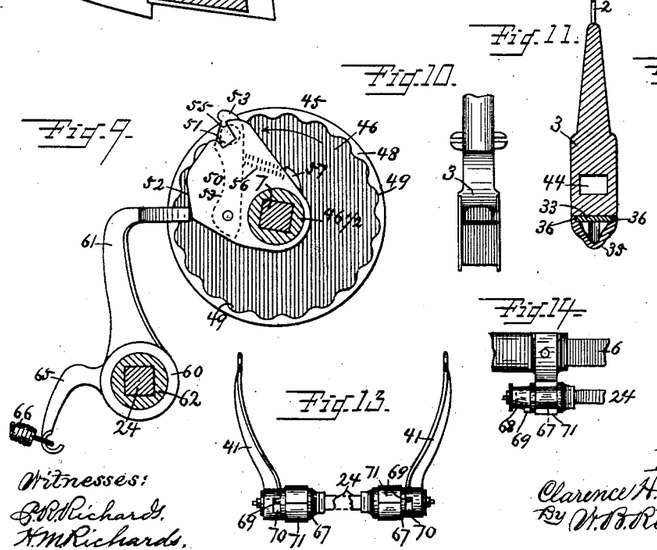
Fig. 9, an enlarged side elevation of the clutch and sectional elevation of other parts, showing the parts of the clutch in different relative positions from that shown at other figures.
Fig. 10, an enlarged rear elevation of the lower end of the seed-tube with the lower valve and its covering cap-plate removed.
Fig. 11, an enlarged sectional plan of the seed-tube and lower valve in the line 11 11 in Fig. 8.
Fig. 13, an enlarged front elevation of the two ends of the rock-shaft and the radius-arms projecting therefrom.
Fig. 14, an enlarged top plan of details hereinafter described.
Figure 12:
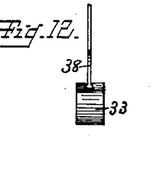
Fig. 12, an enlarged rear elevation of the lower valve and the lower end of the link connected therewith.

The position of the valve 33 to uncover the lower end of the duct 44 in the seed-tube is shown by full lines at Fig. 8, and its position to cover and close said duct is shown by dot-lines at same figure.

The clutch 45 comprises a disk 46, attached to the sprocket-wheel 22 integrally, as shown, or otherwise, and both the disk and sprocket-wheel are loosely mounted on a collar 46½, which is fixed to the shaft 7, so that they are free to rotate on said shaft and collar, while held from movement lengthwise thereof by the projecting ends of the pins 47, which also fix the collar 46½ to said shaft. An annular flange or rim 48 projects laterally from one side of the peripheral part of the disk 46 and has a series of notches 49 extending around its inner surface. The clutch further comprises a plate or arm 50, integral with the collar 46½ or otherwise fixed thereto or to the shaft 7 and which has a notch 51 in its outer end and an inclined or tangential cam-face 52 adjacent thereto, and a dog 53, eccentrically pivoted at its inner end to the plate 50 and provided at its outer end with a stud 54, which carries a roller 55. A spring 56, located between a stud 57 on the plate 50 and the dog 53, normally holds the roller 55 in contact with the notches 49. The mid-length part of the shaft 7 and also of the rock-shaft 24 are supported by an L-shaped bracket-arm 58, which is fixed to one of the frame-bars 6, which in turn is supported by brackets 59, projecting one from each seed-tube.

Figure 7:
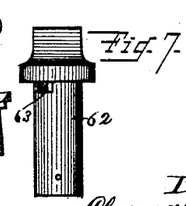
Fig. 7, an enlarged bottom plan of the collar shown in section at Fig. 6 and top plan at Fig. 5.

The hub 60 of the detent 61 is loosely mounted on a collar 62, which is fixed to the rock-shaft 24. The hub 60 carries a short spline 63, Figs. 6 and 7, which seats in a broader recess 64 in said hub and which permits of limited angular movement of the detent 61 backwardly or away from the clutch 45 without movement of the rock-shaft 24, while if the rock-shaft is turned to swing the detent in the same direction the detent will be moved or swung simultaneously with the rock-shaft. An arm 65 projects from the hub 60, and a spring 66, connected at one of its ends to said arm and at its other end adjustably attached, Fig. 1, to one of the transverse frame-bars 6, tends to keep the broadened free end of the detent engaged with the notch 51 in the arm 50 and in contact with the outer end part of the dog 53, so as to force said dog back and hold the roller 55 out of contact with the notches 49 in the rim 48. (See Figs. 3 and 4.) While the roller 55 and arm 50 are so held, the disk 46 and sprocket-wheel 22, actuated by either sprocket-wheel 19 or 20, the wheel or wheels 12, and sprocket-chain 21, or otherwise actuated, are free to revolve on the shaft 7 without imparting any movement to said shaft.

The detent 61 is tripped or drawn back to release the arm 50 and dog 53 in check-rowing by one of the forked levers coming in contact with one of the tappets on the check-row line, thereby swinging said forked lever and turning the rock-shaft 24 so as to trip the detent 61 by swinging it backwardly, and thereby releasing the arm 50 by withdrawal of the detent from the notch 51. When the detent is drawn backwardly, as last described, it will free the dog 53, and the spring 56, then acting on said dog, will force it outwardly, so that the roller 55 will engage with one of the notches 49, and thus lock the shaft 7 with the disk 46 and sprocket-wheel 22, so that said shaft will be rotated by said disk, sprocket-wheel 22, sprocket-chain 21, sprocket wheel or wheels 19 or 20, and the wheel or wheels of the planter. When the forked lever escapes from contact with the tappet and is retracted by the spring 29, connected therewith in an ordinary manner, the detent 61 will by the backward movement of said lever be also tripped or swung toward the clutch and into the position shown at Fig. 9, where the inclined cam-face 52 will come in contact therewith as said arm is revolving with the disk 46 and force the detent 61 backwardly until the notch 51 is brought opposite thereto, when the spring 66 will force the detent into said notch, force the dog 53 backwardly, and thereby force and hold the roller 55 out of engagement with the notches 49. This limited movement of the detent without movement of the rock-shaft is permitted, as hereinbefore described.

Figures 4, 6:
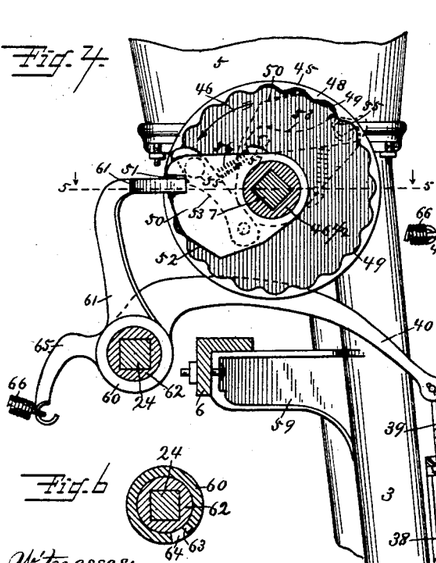
Fig. 4 is an enlarged side elevation of the clutch, part of the seedbox and seed-tube, and adjacent parts and sectional elevation of other parts in the line 4 4 in Fig. 5.
Fig. 6, an enlarged sectional elevation of the check-row rock-shaft, the collar thereon, and of the hub of the trip for the clutch-detent in the line 6 6 in Fig. 5.
Figure 5:
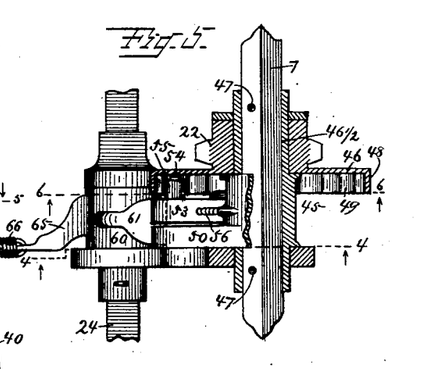
Fig. 5, an enlarged sectional plan of the toothed wheel of the clutch, the sprocket-wheel connected therewith, and the bracket-arm support for the clutch in the line 5 5 in Fig. 4, irregular sectional plan of the collar carrying the clutch and other parts, and top plan of other adjacent parts.

At Fig. 4 the arm 50, dog 53, and its roller 55, engaged with a notch 49, are shown by dot-lines in their relative positions to the disk 46 when they have together completed a few degrees over one-half of a revolution.

Each arm 41 is mounted on the adjacent end part of the rock-shaft 24 as follows: A collar 67, Figs. 13 and 14, fixed to the end of the rock-shaft 24, has a bearing 68 at one end thereof for the hub of one of the arms 41 and has a short spline 69, which seats in a wider recess 70 in said hub. Thus connected when either arm 41 is swung forwardly of the planter by the action of one of the tappets on a forked lever the other arm 41 will not be moved, and when the rock-shaft 24 is given an angular limited movement in the same direction, as hereinafter described, both of the arms 41 will remain at rest. The ends of the rock-shaft 24 are supported by bracket-bearing plates 71, which are fixed to one of the frame-bars 6. At Fig. 14 this bearing is shown with its upper plate removed. Both of the bearing-plates rest between shoulders on the collar 67, and thus prevent endwise movement of the rock-shaft.

The collars 46½, 62, and 67 are required merely as means for forming a round bearing for other parts on shafts square in their cross-sections.

The seeding mechanism of the right-hand seedbox is alone shown after Fig. 1. The other seedbox, being substantially the same, need not be shown.

Figures 20, 21, 22, 23, 24, 25:
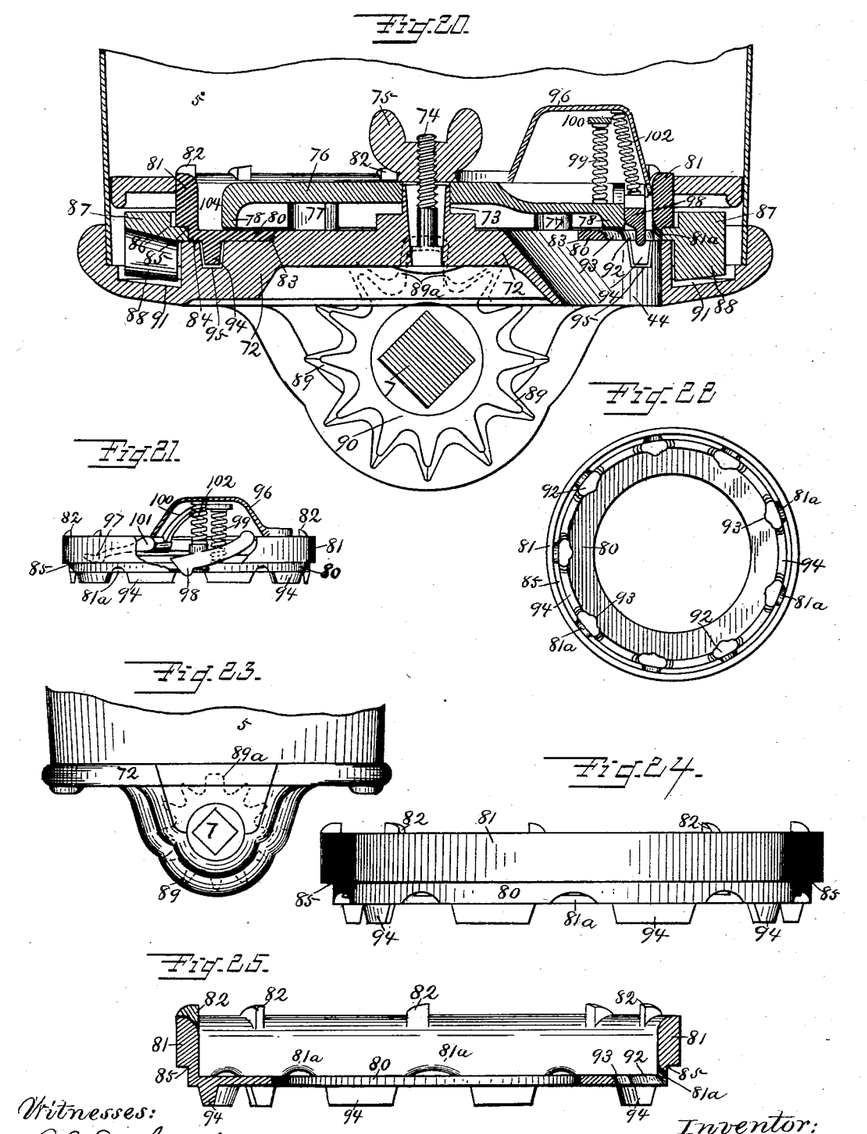
Fig. 20, a full-sized sectional elevation of part of the seedbox and its contained mechanism in the line 20 20 in Fig. 16.
Fig. 21, a rear elevation of the cut-off and grain or kernel discharger with parts exterior thereto broken away to show said cut-off and discharger.
Fig. 22, a plan of seed-cup disk or wheel, seen from below.
Fig. 23, a side elevation of the lower part of a seedbox and adjacent parts, seen from its outer side with reference to the planter.
Fig. 24, a side elevation, full size, of the seed-cup disk or wheel.
Fig. 25, a sectional elevation, full size, of the seed-cup disk or wheel in the line 25 25 in Fig. 17.

The seedbox-bottom 72, Fig. 20, has an ordinary upwardly-projecting stud 73, through which, in this instance, a bolt 74 passes, and has a wing-nut 75 on its upper end part for retaining the cap-plate 76 in operative relation to the other parts. Both this method of securing the cap-plate in place and a stud 73 with a screw-threaded upper end are, as well as other methods therefor, common. The cap-plate 76 has lugs 77 pendent from its lower side, which lugs rest on the bottom 72 and retain the lower edge of the downturned peripheral flange or rim 78 of the cap-plate in a position closely above the seed-cup plate or wheel 80, so that it will retain the seed-cup plate or wheel in position while permitting it to freely revolve. The flange 78 is preferably wide, as shown, for purposes hereinafter described. It will be evident that the cap-plate 76 may be as thick as the width of the flange 78 and the flange dispensed with, if preferred.

Figures 16, 17, 18:
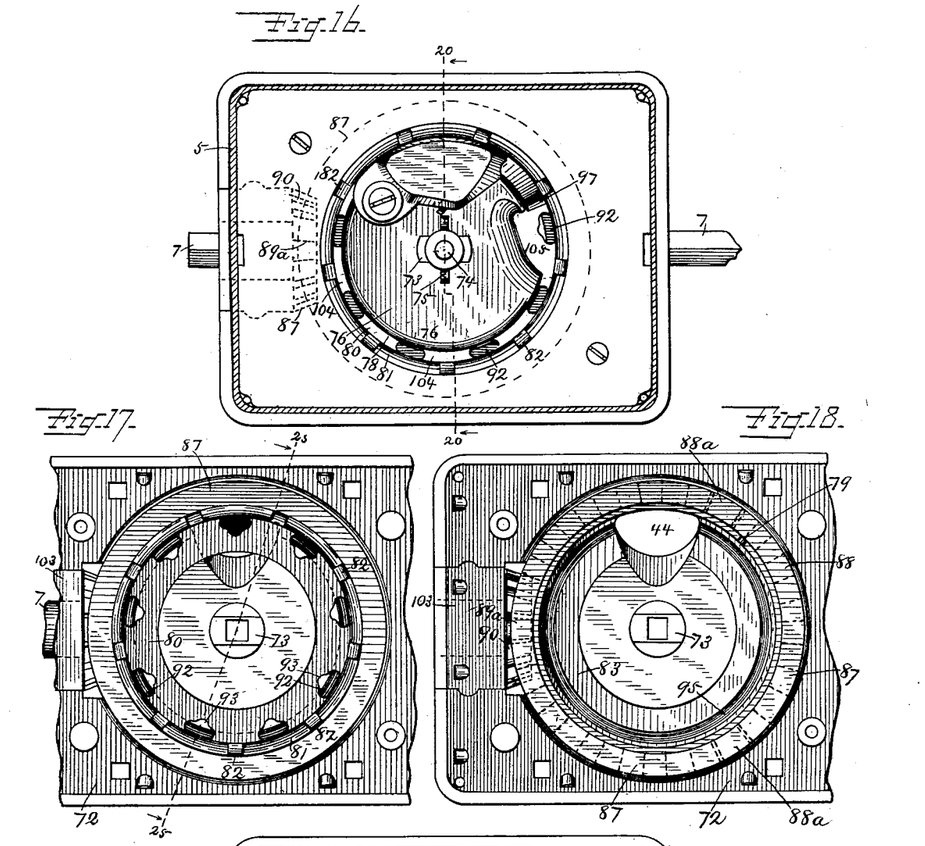
Fig. 16, an enlarged sectional plan of one of the seedboxes and top plan of the seed measuring and delivering mechanism contained therein and of the rotating shaft which actuates them.
Fig. 17, substantially same enlarged top plan as shown at Fig. 16 with the cap-plate, cut-off, and false bottom of the seedbox removed to show parts below. In this figure the seedbox-bottom is shown as broken away.
Fig. 18, substantially same enlarged top plan as shown at Fig. 16, with the seed-cup disk or wheel also removed to show the bottom of the seedbox with the annulus-shaped gear-wheel in place.

The annulus-shaped valve seed-cup plate or wheel 80, Fig. 20, in this instance has an annulus-shaped rim or flange 81 projecting upwardly from its outer edge part or periphery. Short studs or pins 82 in this instance project upwardly at intervals from the upper surface of the rim 81. The rim 81 is preferably somewhat higher than the upper surface of the cap-plate 76. The inner portion of the valve seed-cup disk or plate 80 rests in an annular rabbet 83 in the bottom 72 and its outer portion on an annular ledge 84. An annular rabbet 85 in the outer lower edge of the seed-cup wheel or plate rests upon an annular rabbet 86 in the inner upper surface of the annulus-shaped wheel 87 and serves to hold said wheel in position on the annular ledge 84, which projects upwardly from the seed-cup bottom. The wheel 87 has bevel-teeth 88 on its lower surface, which mesh with bevel-teeth 89 on a wheel 90, fixed to the shaft 7, so that the wheel 87 and through it the seed-cup wheel or plate 80, which is connected therewith, as usual, by the lugs 79, are revolved by the shaft 7, as hereinafter described. The teeth 88 project downwardly into an annular groove 91 in the seedbox-bottom 72. The seed-cups 92, of which there is a circular series, are each elongated in line with the circle of the series, are narrow radially of the seed-cup valve or wheel, and each has an enlargement 93 at its inner side and central part, substantially as shown. The functions of this form of seed-cup in the combination shown are hereinafter described. A pendent sweep 94 is located on the lower side of the seed-cup wheel or plate between each two of the seed-cups, (bottom plan thereof at Fig. 22,) and these sweeps extend downwardly into an annular groove 95, Fig. 20, in the seedbox-bottom, which groove is of substantially the same width as the seed-cups 92 less the lateral enlargements 93 of the seed-cups, so that the inner wall or rabbet 83 of the seedbox-bottom will extend beneath the enlargements 93, (see dot lines at Fig. 17,) for purposes hereinafter described.

Figure 19:
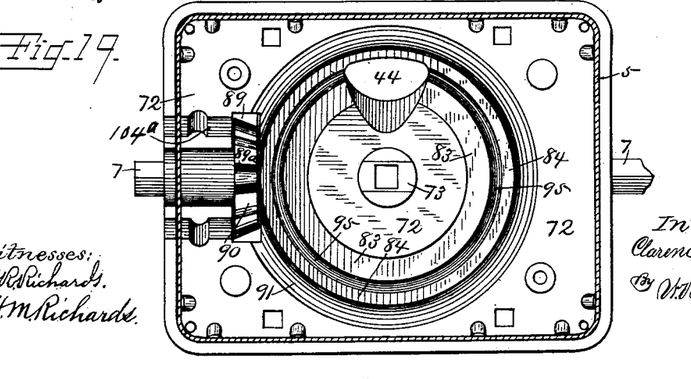
Fig. 19, substantially same enlarged top plan as Fig. 18 with the annulus-shaped gear-wheel removed.

The fixed cap-plate 76 has an ordinary cap or cover 96, Figs. 20 and 21, fixed thereto for an ordinary yielding cut-off 97 and yielding grain or kernel discharger 98. The cut-off is held in yielding contact with the seed-cup wheel 80 by means of a spring 99 beneath an arm 100, projecting in rear of the fulcrum 101. The discharger 98 is pivoted at one end and is forced downwardly at its other end by a spring 102. The cut-off and discharger operate in an ordinary manner. Grains or kernels as they come in contact with the inclined free end of the discharger raise it, pass under it, and are forced by it downwardly out of the seed-cups and into the throat of the seed-duct 44. It will thus be seen that the cap-plate 76 carries the cut-off and discharger, is held down by the wing-nut 75, and holds the parts assembled below it in operative positions by acting directly on the seed-cup plate or wheel 80, which in turn rests upon the annular wheel 87 and holds it in place. After removal of the wing-nut the parts assembled below can be quickly and easily removed by simply lifting them from their positions in the order last recited. A removable plate 103, Figs. 17 and 18, seated in an opening 104ª in the false bottom 72, Fig. 19, provides access to the wheel 90.

While grains or kernels of corn of different varieties, of different growths, and from different ears, and not being grains grown at the ends of ears often vary considerably in width and in their lengths, they are of substantially the same thickness, and advantage has been taken of this natural peculiarity in their forms in devising my improvements in means for separating single grains or kernels from the supply in the seedbox and delivering them to the throat of the seed-duct 44. The groove or feedway 104, formed by the side of, or flange 78 of the cap-plate 76 and the rim 81 of the seed-cup wheel 80, with no intervening or intermediate parts, is narrow and deep, is of such narrow width that grains of corn or similar seed can only enter it standing on their edges and either with one of their edges or one of their ends downward. The narrow structure of this groove or feedway especially in relation to other parts is more than formal. It is functional in that it reduces to order and system the manner in which single grains or kernels of corn must enter it and fall into rank in a circular row, from which the narrow seed-cups immediately below the groove receive their single-grain charges, each grain standing either on one of its edges or its end, as they cannot lying flatwise on their sides enter the narrow seed-cups. This narrow groove thus becomes an efficient feeder of single grains not only downwardly edgewise of themselves, but also edgewise of themselves forwardly in the direction of rotation of the seed-cup valve or wheel and thus deliver them to the narrow seed-cups, which are adapted to receive grains only when so presented edgewise thereto and whereby such seed-cups will be uniformly charged with single grains of seed.

In its revolutions the rim 81 carries the lugs or projections 82 around with it, and these lugs by stirring or agitating the seed in and near their circular path prevent the seed bridging over the groove 104. The action of said lugs on the grains of corn tends also to facilitate their arrangement in proper order to fall edgewise into place in said groove or channel. The revolving rim 81 as it is in contact with the grains of seed also tends to push them around into proper alinement or arrangement to facilitate their entering said groove or feedway edgewise. The cap-plate 76 is cut away to form an enlargement 105 of the groove or channel 104 for a short distance in front of the cut-off 97, and that portion of the groove or channel in which said cut-off is located is wider than its other portions. Round grains or kernels and other irregularly-shaped grains from the end parts of the ears and which cannot enter the narrow part of the groove or feedway can enter the part 105, where they can freely enter any uncharged seed-cup with its enlarged side part therein exposed and be carried under and past the cut-off in the widened groove. The enlargement 105 also permits of grains projecting above the seed-cup wheel and grains crowded on those in the seed-cups being swept back by the cut-off. The side walls of the groove 104 may be parallel with each other or eccentric, as shown, to form a groove slightly wider next the enlargement 105 than at its diametrically opposite end.

Grains or kernels located in the seed-cups, as described, will project downwardly into the lower groove or channel 95, and will thus be permitted to pass freely beneath the cut-off. The grains are held by the walls of said groove 95 in so nearly upright and central positions that small round grains and other grains cannot enter the seed-cups at the sides of such upright grains. A sweep 94 follows each seed-cup in the groove 95 and sweeps the grain or kernel in advance of it to the throat of the seed-duct 44. By this means small round grains and narrow grains which might not be carried along by the seed-cups are carried to the discharge. The sweeps also sweep all dust, debris, and other matter from the groove 95 to the discharge, and thus prevent accumulations of such matter below the seed-cup wheel. By the use of a thicker seed-cup plate or wheel the groove 95 and sweeps 94 may be dispensed with, but they add greatly to the efficiency of the device with thin seed-cup plates, which are preferable in measuring and delivering single-grain charges with uniformity and regularity. The rim 81 is slightly beveled or cut away at 81ª on its inner side and above each seed-cup to facilitate the entrance to the seed-cups of the larger round grains. The shaft 7 in this instance and as shown is so geared with the annular wheel 87, which is removably connected with the seed-cup plate or wheel in an ordinary manner, that one revolution of the clutch 45 and shaft 7 will impart one-third of a revolution to the seed-cup plate or wheel and thus carry three of the nine seed-cups past the cut-off and over the discharge and thereby deliver three grains or kernels to the seed-duct 44 and to the valve 33 at its lower end.

Each tappet 31, acting on a forked lever to swing it backwardly of the planter, trips the seed-cup plate or wheel into gear with the planter wheel or wheels for actuating the seed-cup wheel, as described, and delivering the three grains or kernels to the lower valve, and the same movement of the forked lever, acting directly on the lower valve 33 through the instrumentality of the arm 40 and rock-shaft 24, raises the valve 33 and thus discharges the previously-received charge of seed. The reverse movement of the forked lever after it escapes from the tappet slides the valve 33 down to close the lower end of the seed-duct and retain the charge of seed, delivered thereto by the movement given the forked lever by its contact with a tappet, ready for delivery at the next backward movement of the forked lever by the action thereon of a tappet.

The gear connection between the planter wheel or wheels and the seed-cup plate or wheel and the relative size of the planter-wheels and distances between the tappets on the check-row line are such that the single revolution of the clutch and the discharge of seed from the seed-cup wheel is effected before the planter-wheels have traversed or rolled two-thirds of the distance between the tappets on the check-rower line or distance between the check-rows. Hence no irregularity found in the surface of soil fitly prepared for planting and no usual slipping of the planter-wheels will prevent the charges of seed being delivered regularly to the lower valve in time for their discharge therefrom at the proper time and place for check-row planting.

With about three seed-cup plates or wheels with seed-cups of slightly-different lengths and with slightly-different enlargements at their sides a planter can be supplied with a plate or wheel adapted for grains of different lengths and for corn having round grains of different sizes. By the use of seed-cup wheels having four seed-cups in the same extent of arc occupied by the three seed-cups, as shown, four grains or kernels will be delivered in each charge to the lower valve or foot-valve, and other changes may be made on this line.

To prevent placing the seed-cup wheels in wrong positions with respect to other parts when removed for any purpose, one of the cogs 89ª on the cog-wheel 90 (see Fig. 20) is enlarged so that it will not enter any of the spaces between the cogs 88 on the wheel 87, except three wide spaces 88ª, (see Fig. 18,) between each two of which wide spaces there are three seed-cups and eleven other spaces. When either wide space 88ª is placed over the wide cog 89ª, the seed-cups will register properly with the throat to the seed-duct 44.

Figure 3:
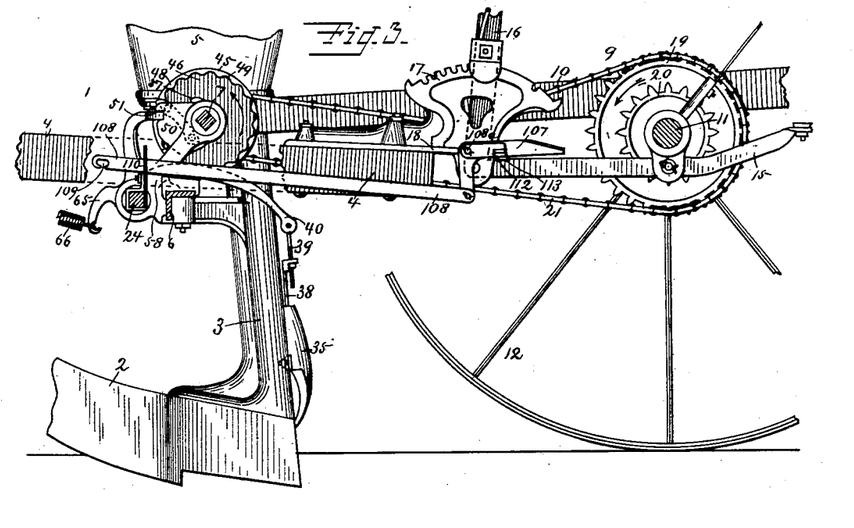
Fig. 3, an enlarged sectional elevation in the line 3 3 in Fig. 1. In this figure certain parts are shown as broken away to prevent their obscuring other parts.
Figure 15:
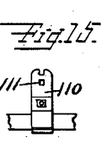
Fig. 15, an enlarged front elevation of a detail hereinafter described.

A bell-crank-shaped foot-lever 107 is pivotally mounted at its bend on a stud-pin 108ª, which projects laterally from the plate 18, Figs. 1, 3, and 8. The lower or shorter arm of the lever 107 is pivotally connected with one end of a connecting rod or link 108, the forward end of which has a notch 109, adapted to stride the upper notched end of an arm 110, which arm has a perforation 111, Fig. 15, with which the points at the sides of the notch 109 in the link 108 engage for greater security. When the check-row line is used in check-row planting, as hereinbefore described, the forward end of the link 108 is disengaged from the arm 110, as shown at Figs. 1 and 3. By engaging the forward end of said link with the arm 110, as shown at Fig. 8, the driver on his seat with his foot on the upper part of the lever 107 can operate the lower valve in the seed-tube in an evident manner for check-row planting, while the dropping mechanism in the seedbox is intermittently operated by the planter wheel or wheels, as in check-row planting with the check-row line. While operating the foot-lever as last described, the dog 112, which is pivotally mounted on the stud-pin 108ª, is in its turned-back position resting on a stud 113, projecting from a lever 107, (shown at said figure,) where it will not interfere with the movement described of the foot-lever.

By pressing down the rear end of the lever 107 and throwing the dog 112 over into the position shown at Fig. 8 it will lock the lever 107 and link 108 rigidly in the positions shown at same figure, and thereby hold the detent 61 back and free from the notch 51 in the plate 50, and thus lock and retain the lower valve 33 up and in its open position. While the lower valve is retained in the position last described, the machine can be used as a drill-planter, the check-rower line not being used and the seed measuring and delivering mechanism in the seedbox being continuously operated by the continuous rotation of the clutch 45 while the planter is moving forwardly. It will be evident that the machine is quickly and easily convertible from a check-rower to a drill-planter by simply fixing the lower valve 33 in its upper position to uncover the lower end of the seed-duct 44.

The gear is with the larger rear sprocket-wheel 19 for drilling grains or kernels about nine inches apart. Greater distances between the drilled grains is effected by smaller sprocket-wheels, as 20. Distances apart of the deposited grains in drilling can also be regulated by different seed-cup wheels.

I desire it understood that I do not limit my claims to the details of construction shown, in which I have simply illustrated one way of embodying the creative part or conception of the invention in a concrete form in a structure or machine.

The described devices are simply embodiments of the invention which other and different structures might also embody, and some of the parts, as also combinations of parts, may be used without the others in different types of planters without departure from the purview of my invention, and I regard myself as entitled to such variations from the shown and described devices as fall within the scope of my invention as expressed in the claims forming part of this specification.

What I claim as new, and desire to secure by Letters Patent, is—

1. In a corn-planter, and in combination, substantially as described, a seed-cup wheel having an annular rim projecting upwardly from its outer side or periphery, and a central cap-plate located within said rim, whereby the narrow space or groove between the rim and cap-plate one side or wall of which is formed by said rim with which the grains of seed come in contact serves as a feeder to conduct and deliver grains of seed on edge from the supply in the seedbox to the underlying seed-cups in said seed-cup wheel.

2. In a corn-planter, and in combination substantially as described, a seed-cup wheel having an annular rim projecting upwardly from its outer side, seed-agitating lugs projecting from the upper side of said rim, and a central cap-plate located within said rim and at such distance therefrom as to leave a narrow groove or seed-feedway between them which will only admit grain edgewise, and which serves to feed grains or kernels of corn edgewise to the underlying seed-cups in the seed-cup plate.

3. In a corn-planter, and in combination substantially as described, a seed-cup wheel having seed-cups elongated circumferentially of said wheel and contracted or narrow radially thereof, and having an annular rim projecting upwardly from its outer side, and a central cap-plate located within said rim and at such distance therefrom as to leave a narrow groove or feedway between them which will only admit grains edgewise, and which serves to feed grains or kernels of corn edgewise to the underlying narrow seed-cups in the seed-cup plates.

4. In a corn-planter, and in combination substantially as described, a seed-cup wheel having seed-cups elongated circumferentially of said wheel, and contracted or narrow radially of said wheel, and a narrow groove in the parts above the series of seed-cups which will only admit grains edgewise, and by and through which grooves the grains or kernels are fed edgewise to the underlying seed-cups.

5. In a seed measuring and delivering mechanism, the combination of a seed-cup wheel or plate, and an overlying narrow seed-receiving groove or feedway, wherein the grains of corn, by its narrow construction can only be admitted thereto edgewise, and are discharged therefrom edgewise to the seed-cups of said seed-cup wheel or plate, substantially as described.

6. A seed-cup wheel for corn-planters, having a horizontal part with narrow seed-cups elongated circumferentially of the wheel, and a rim or flange projecting upwardly from the periphery of the horizontal part and provided with seed stirring or agitating lugs, substantially as described.

7. A seed-cup wheel for corn-planters, having seed-cups elongated circumferentially of the wheel, and with lateral enlargements substantially such as hereinbefore described.

8. In a corn-planter, and in combination substantially as described, a cut-off, a seed-cup wheel having seed-cups elongated circumferentially of said wheel, narrow radially thereof and provided with lateral enlargements substantially such as described, and a single-grain-feeding groove in or between the parts overlying the seed-cup wheel, which groove in its main part is substantially the same width as the seed-cups less their lateral enlargements, and at its end next the cut-off is enlarged laterally to admit large round grains and other abnormally-shaped grains.

9. In a corn-planter, and in combination substantially as described, a cut-off, a seed-cup wheel having seed-cups elongated circumferentially of said wheel, narrow radially thereof and provided with lateral enlargements substantially such as described, an annular flange or rim projecting upwardly from the periphery of said wheel and provided with seed-agitating lugs, and a central cap-plate between which and said rim is an annular channel or groove which will only admit grains edgewise, and which is enlarged laterally in front of the cut-off by a recessed part of said cap-plate.

10. In a corn-planter, and in combination substantially as described, a cut-off, a seed-cup wheel having seed-cups elongated circumferentially of said wheel, narrow radially thereof and provided with lateral enlargements substantially such as described, an annular flange or rim projecting upwardly from the periphery of said wheel, and a central cap-plate between which and said rim is an annular channel or groove which will only admit grains edgewise, and which is enlarged laterally in front of the cut-off by a recessed part of said cap-plate.

11. In a corn-planter, and in combination, substantially as described, a seed-cup wheel having seed-cups, a series of sweeps pendent from said seed-cup wheel and arranged alternately with said seed-cups, and a seedbox-bottom or underlying plate with an annular groove which said sweeps traverse as the seed-cup wheel is revolved.

12. In a corn-planter, and in combination, substantially as described, a seed-cup wheel having seed-cups, and an underlying plate or seedbox-bottom with an annular groove coincident with the series of seed-cups and of such narrow width that it will only receive the grains of corn edgewise which project downwardly through the seed-cups, and will retain them in substantially upright positions.

13. In a corn-planter, and in combination substantially as described, a seed-cup wheel having seed-cups, a narrow grain-feeding groove in or between the parts overlying the seed-cup wheel, and a plate or seedbox-bottom underlying the seed-cup wheel and having a groove coincident with the series of seed-cups, adapted to sustain grains of seed lying edgewise and projecting below the seed-cups in substantially vertical positions.

14. In a corn-planter, and in combination substantially as described, a seed-cup wheel having seed-cups and an annular rim or flange projecting upwardly from its periphery with grain-agitating lugs thereon, a narrow grain-feeding groove in or between the parts overlying the seed-cup wheel, and a plate or seedbox-bottom underlying the seed-cup wheel and having a groove coincident with the series of seed-cups.

15. In a corn-planter, and in combination substantially as described, a seed-cup wheel having seed-cups elongated circumferentially of said wheel, an annular rim or flange projecting upwardly from its periphery, and lugs pendent from its lower side, a cap-plate arranged relatively to said annular rim to form a narrow groove between them, a seedbox-bottom with an annular groove which said pendent lugs traverse, an annulus-shaped cog-wheel operatively and removably connected with the seed-cup wheel, a binding-screw for operatively connecting said parts, and a false bottom overlying the annulus-shaped cog-wheel.

16. In a corn-planter, and in combination substantially as described, a seed-cup wheel having seed-cups elongated circumferentially of said wheel, an annular rim or flange projecting upwardly from its periphery, lugs on the upper edge of said rim, lugs or sweeps pendent from the lower side of the seed-cup wheel, a cap-plate arranged relatively to said annular rim to form a narrow groove between them, a seedbox-bottom with an annular groove which said pendent lugs or sweeps traverse, an annulus-shaped bevel gear-wheel operatively and removably connected with the seed-cup wheel, and provided with larger and smaller interspaces between its teeth substantially as described, and a rotary shaft carrying a bevel gear-wheel with a series of teeth, one larger than the others.

17. In a corn-planter, and in combination substantially as described, a cut-off, a grain-discharger, a seed-cup wheel having seed-cups elongated circumferentially of said wheel, narrowed radially thereof and provided with lateral enlargements substantially such as described, an annular flange or rim projecting upwardly from the periphery of said wheel and provided with seed-agitators, a central cap-plate between which and said rim is an annular channel or groove which will only admit grains edgewise and which is enlarged laterally in front of the cut-off by a recessed part of said cap-plate, and a seed-box-bottom with a part projecting beneath the path of the lateral enlargements of the seed-cups, except over the throat to the seed-duct in the seed-tube.

18. In a corn-planter, and in combination substantially as described, a seed-cup wheel with seed-cups elongated circumferentially of said wheel and having lateral side enlargements, and a central cap-plate which extends over the lateral enlargements at the inner side of the seed-cups.

19. In a corn-planter, and in combination substantially as described, a cap-plate, a seed-cup wheel having an upwardly-projecting annular rim on its periphery which revolves with said wheel, and which is so located with reference to the main part of the cap-plate that the space between the two forms a narrow groove or channel, which will only admit grains of corn edgewise, whereby said groove or channel has a revolving wall on one side thereof and a fixed wall on its other side.

20. In combination with a seed-cup plate or wheel, an overlying groove or channel, one wall of which is a fixed plate and the other wall a revoluble annulus-shaped plate, substantially as and for the purpose described.

21. In combination with a seed-cup plate or wheel, an overlying groove or channel, one wall of which is a fixed plate and the other wall a revoluble annulus-shaped plate with seed-agitating lugs projecting from its upper side, substantially as and for the purpose described.

22. In a corn-planter, in combination substantially as described, a traction wheel or wheels, seedboxes, seed measuring and delivering mechanism in said seedboxes, a rotary shaft extending across the planter between said seedboxes and geared with said seeding mechanism, a gear-wheel loosely mounted on said rotary shaft, gear connection between said gear-wheel and the traction wheel or wheels, a rock-shaft adjacent to said rotary shaft and provided with forked levers, a check-row line, means for actuating said rock-shaft by the tappets on the check-row line, a clutch on said rotary shaft, one member of which is fixed to said gear-wheel, and a detent on the rock-shaft adapted to be tripped out of gear with said clutch by the check-row line, whereby the rotary shaft is tripped into gear with the traction wheel or wheels for actuating said seeding mechanism, and means for tripping said detent into gear with the clutch for arresting the rotation of said rotary shaft.

23. In a corn-planter, and in combination substantially as described, seed measuring and delivering mechanism in the seedboxes, a rotary shaft actuated by traction wheel or wheels, a rock-shaft actuated by tappets on a check-row line, a clutch mechanism mounted on said rotary shaft, comprising a disk with an internally-notched rim loosely mounted on the rotary shaft and connected with the sprocket-wheel also loosely mounted on said rotary shaft and geared with the traction wheel or wheels, an arm 50 fixed to the rotary shaft and provided with a notch 51 and cam-face 52, a dog 53 eccentrically pivoted to the arm 50 and provided with a roller 55, a detent mounted on said rock-shaft, actuated by the check-row line, and adapted to contact with the cam-face 52, whereby it is forced backwardly until opposite the notch 51 into which it enters and forces the dog 53 back to release its roller 55 from the notches 51.

24. In a corn-planter, and in combination substantially as described, seed measuring and delivering plates or wheels, in the seedboxes, a rotary shaft geared with the planter-wheels, extending across the planter substantially in line with the seedboxes and geared with said seed measuring and delivering mechanism therein, a rock-shaft having forked levers on its ends, a check-row line with tappets, means for operatively connecting said check-row line and rock-shaft, a clutch mounted on said rotary shaft, and a detent mounted on the rock-shaft, whereby the tappets on the check-row line shall alone control the movements of said seed measuring and delivering mechanism, and whereby said seeding mechanism shall operate for an invariable predetermined interval after one tappet has acted on the rock-shaft and before the next succeeding tappet acts thereon.

25. In a combined check-row and drill planter, and in combination, substantially as described, seed measuring and delivering plates or wheels in the seedboxes, seed-discharging valve or valves in the seed-tube, a rotary shaft geared with the planter wheel or wheels, extending across the planter substantially in line with the seedboxes, and geared with said seed measuring and delivering mechanism therein, a rock-shaft, an arm fixed to said rock-shaft at one end and operatively connected at its other end with the valve or valves in the seed-tube, a check-row line with tappets, means for operatively connecting said check-row line and rock-shaft, a clutch mounted on said rotary shaft, and a detent mounted on the rock-shaft, whereby the tappets on the check-row line shall alone actuate the lower valve or valves, and shall alone control the movements of the seed measuring and delivering mechanism in the seedbox, and whereby said last-named mechanism shall operate for an invariable predetermined interval after one tappet has acted on the rock-shaft and before the next succeeding tappet acts thereon.

26. In a corn-planter, and in combination substantially as described, a seed-tube having its lower end part and rear side terminated by a curved part substantially as described, a curved valve, and a removable cap-plate with grooves which form ways in which said valve slides to cover and to uncover the lower end of the seed-duct in the seed-tube.

27. In a corn-planter, and in combination substantially as described, a seed-tube having its lower end part and rear side terminated by a curved part, substantially as described, a curved valve, and a cap-plate with grooves which form ways in which said valve slides, a rock-shaft, an arm extending from said rock-shaft, a link pivotally connected with said valve, and another link adjustably connected with the first-named link, and also with said arm.

28. In a combined check-row and drill planter, and in combination substantially as described, seed measuring and delivering plates or wheels in the seedboxes, a rotary shaft geared with to be actuated by the planter-wheels and also geared with said seed measuring and delivering mechanism, a clutch mechanism mounted on said rotary shaft, a rock-shaft, a detent mounted on said rock-shaft, a spring for holding the detent in engagement with said clutch, a lower valve in the seed-tube, means for connecting said lower valve with an arm connected with said rock-shaft, another arm mounted on said rock-shaft, a lever pivotally mounted on the planter-frame, a link pivotally connected with said lever and removably connected with said last-named arm, whereby the driver may by operating said lever thereby actuate the lower valve in the seed-tube and control the operation of the seeding mechanism in the seedboxes for check-row planting.

29. In a combined check-row and drill planter, and in combination, substantially as described, seed measuring and delivering plates or wheels in the seedboxes, a rotary shaft geared with to be actuated by the planter-wheels and also geared with said seed measuring and delivering mechanism, a clutch mechanism mounted on said rotary shaft, a rock-shaft, a detent mounted to have limited angular movement on said rock-shaft and operated by the tappets on the check-row line acting on the rock-shaft, a spring for holding the detent in engagement with said clutch, a lower valve in the seed-tube, means for connecting said lower valve with an arm connected with said rock-shaft, another arm mounted on the rock-shaft, a lever pivotally mounted on the planter-frame, a link pivotally connected at one end with said lever and removably connected with said last-named arm, whereby said lever may be adjusted to hold the detent out of engagement with the clutch and the lower valve in its open position for drill-planting, and a dog engaging with said lever and locking it to hold the detent in the position described.

30. In a combined check-row and drill planter, and in combination substantially as described, seed measuring and delivering plates or wheels in the seedboxes, a rotary shaft geared with to be actuated by the planter-wheels and also geared with said seed measuring and delivering mechanism, a clutch mechanism mounted on said rotary shaft, a rock-shaft, a detent mounted on said rock-shaft, a spring for holding the detent in engagement with said clutch, a lower valve in the seed-tube, means for connecting said lower valve with an arm connected with said rock-shaft, another arm mounted on said rock-shaft, a lever pivotally mounted on the planter-frame, a link pivotally connected with said lever and removably connected with said last-named arm, whereby the driver may by operating said lever thereby actuate the lower valve in the seed-tube and control the operation of the seeding mechanism in the seed-boxes for check-row planting, and arms connected with and actuated by the check-row line and mounted on the rock-shaft to have limited angular movement thereon, whereby the check-row levers and said arms will remain at rest while the rock-shaft is manually operated.

31. In a corn-planter, and in combination substantially as described, forked levers, a check-row line with tappets, a rock-shaft, arms on said rock-shaft, an eyebolt pivotally connected with each forked lever, and a link pivotally connected at one end with one of said arms and adjustably connected at its other end with one of said eyebolts.

In testimony whereof I affix my signature in presence of two witnesses.

CLARENCE H. DOOLEY.

Witnesses:
L. A. TOWNSEND,
H. M. RICHARDS.